United States Patent
Yi

(10) Patent No.: US 12,363,039 B1
(45) Date of Patent: Jul. 15, 2025

(54) SYSTEMS AND METHODS FOR HANDLING PROTOCOL DATA UNIT SETS

(71) Applicant: CABLE TELEVISION LABORATORIES, INC., Louisville, CO (US)

(72) Inventor: Yunjung Yi, Vienna, VA (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 18/382,944

(22) Filed: Oct. 23, 2023

Related U.S. Application Data

(60) Provisional application No. 63/418,280, filed on Oct. 21, 2022.

(51) Int. Cl.
*H04L 47/12* (2022.01)
*H04L 47/26* (2022.01)

(52) U.S. Cl.
CPC .............. *H04L 47/12* (2013.01); *H04L 47/26* (2013.01)

(58) Field of Classification Search
None
See application file for complete search history.

(56) References Cited

U.S. PATENT DOCUMENTS

| | | | |
|---|---|---|---|
| 8,274,974 B1* | 9/2012 | Gupta | H04L 49/201 370/230.1 |
| 11,888,691 B1* | 1/2024 | Jain | G11C 7/1036 |
| 2006/0092836 A1* | 5/2006 | Kwan | H04L 47/2466 370/389 |
| 2006/0176810 A1* | 8/2006 | Kekki | H04W 8/04 370/229 |
| 2014/0047232 A1 | 2/2014 | Hannel et al. | |
| 2018/0091999 A1 | 3/2018 | Zhang et al. | |
| 2019/0215729 A1 | 7/2019 | Oyman et al. | |
| 2022/0368640 A1 | 11/2022 | Wheelock | |
| 2023/0189058 A1 | 6/2023 | Yeh et al. | |
| 2023/0309100 A1* | 9/2023 | Baek | H04W 72/20 |
| 2023/0319638 A1* | 10/2023 | Kahn | H04W 28/0268 370/252 |
| 2023/0344772 A1 | 10/2023 | Johansson | |
| 2023/0354091 A1 | 11/2023 | Zhang et al. | |
| 2024/0388633 A1 | 11/2024 | Yu et al. | |

* cited by examiner

*Primary Examiner* — Fadi Haj Said
(74) *Attorney, Agent, or Firm* — Josh C. Snider.; Snider IP

(57) ABSTRACT

A method of processing a protocol data unit (PDU) set for a data network includes steps of (a) receiving a first PDU packet of the PDU set, (b) receiving, subsequent to reception of the first PDU packet, a second PDU packet of the PDU set, (c) determining, after receiving the first and second PDU packets, a congestion status of the data network for the PDU set, (d) controlling, based on the determined congestion status, a handling state of the second PDU packet to match a handling state of the first PDU packet, and (e) transmitting the first PDU packet and the controlled second PDU packet to a destination receiver of the data network.

20 Claims, 2 Drawing Sheets

SYSTEMS AND METHODS FOR HANDLING PROTOCOL DATA UNIT SETS

CROSS REFERENCE TO RELATED APPLICATIONS

This application claims the benefit of and priority to U.S. Provisional Application No. 63/418,280, filed Oct. 21, 2022, which is hereby incorporated by reference in its entirety.

BACKGROUND

The field of the invention relates generally to communication systems, and more specifically, to communication systems and methods utilizing sets of protocol data units (PDUs).

The Third Generation Partnership Project (3GPP) sets standards for mobile and cellular telecommunications technologies, including radio access, core network, and service capabilities. These standards are defined by a number of 3GPP Technical Specifications (TSs) and Technical Reports (TRs), which further provide hooks for non-radio access to the core network, and for interworking with non-3GPP networks. 3GPP technologies continue to evolve to cover further generations beyond 3G, including Fifth Generation (5G) and Long Term Evolution (LTE) networks and communications.

3GPP TS 37.340 (Releases 15-17.2.0) defines (i) PDU handover procedures for a PDU session, for both roaming and non-roaming scenarios, and with respect to both 3GPP access and non-3GPP access, and also (ii) user plane connectivity or dual connectivity for multi-RAT scenarios. PDU sets are defined in 3GPP TR 23.700-60 (e.g., through version 1.1.0), and particularly with respect to a Study on extended Reality (XR) and media services, as well as related XR traffic configuration techniques. Section 6.46.2.2 of 3GPP TR 23.700-60 illustrates, in FIG. 6.46.2.2-1, a 5G system utilizing Explicit Congestion Notification (ECN) marking for downlink transmissions. 3GPP TS 37.340 (Releases 15-17.2.0) defines a PDU handover procedure for a PDU session, for both roaming and non-roaming scenarios, and with respect to both 3GPP access and non-3GPP access.

These known proposals, however, do not include solutions for controlling the quality (e.g., jitter, reliability, etc.) across multiple PDU packets that may be included in an individual PDU set. For example, different PDU packets within a set may be handled differently, and thus some PDU packets within the same PDU set may arrive outside of a delay boundary for the set, and therefore be considered missing packets. In the case of missing packets, an entire PDU set may be dropped. Such problems are particularly challenging for XR applications of a data network, where a single PDU set may traverse a plurality of access networks, and where individual PDU packets of the set may originate from different networks. Accordingly, there is a need in the field to manage PDU sets such that the quality of the PDU packets contained therein may be better controlled as the PDU set traverses a data network.

SUMMARY

In an embodiment, a method of processing a protocol data unit (PDU) set for a data network includes steps of (a) receiving a first PDU packet of the PDU set, (b) receiving, subsequent to reception of the first PDU packet, a second PDU packet of the PDU set, (c) determining, after receiving the first and second PDU packets, a congestion status of the data network for the PDU set, (d) controlling, based on the determined congestion status, a handling state of the second PDU packet to match a handling state of the first PDU packet, and (e) transmitting the first PDU packet and the controlled second PDU packet to a destination receiver of the data network.

In an embodiment, a method of processing a protocol data unit (PDU) set for a data network includes steps of (a) receiving a first PDU packet of the PDU set (b) receiving, subsequent to reception of the first PDU packet, a second PDU packet of the PDU set, (c) identifying that the first PDU packet is the first PDU packet of the PDU set in time, (d) determining a congestion status for the PDU set based on the received first PDU packet, (e) controlling, based on the determined congestion status, a handling state of the second PDU packet to match a handling state of the first PDU packet, and (f) transmitting the first PDU packet and the controlled second PDU packet to a destination receiver of the data network.

In an embodiment, an access node is provided for a data network. The access node includes a processor and a memory having computer-executable instructions stored therein. When executed by the processor, the instructions cause the access node to (a) receive (i) a first protocol data unit (PDU) packet of a first PDU set, and (ii) a second PDU packet of the first PDU set subsequent to reception of the first PDU packet, (b) establish a distinct PDU session for the first PDU set, (c) determine a congestion status of the data network for the PDU set, (d) control, based on the determined congestion status, a handling state of the second PDU packet to match a handling state of the first PDU packet, and (e) transmit the first PDU packet and the controlled second PDU packet to a destination receiver of the data network.

BRIEF DESCRIPTION

These and other features, aspects, and advantages of the present disclosure will become better understood when the following detailed description is read with reference to the following accompanying drawings, in which like characters represent like parts throughout the drawings.

Figure 1:
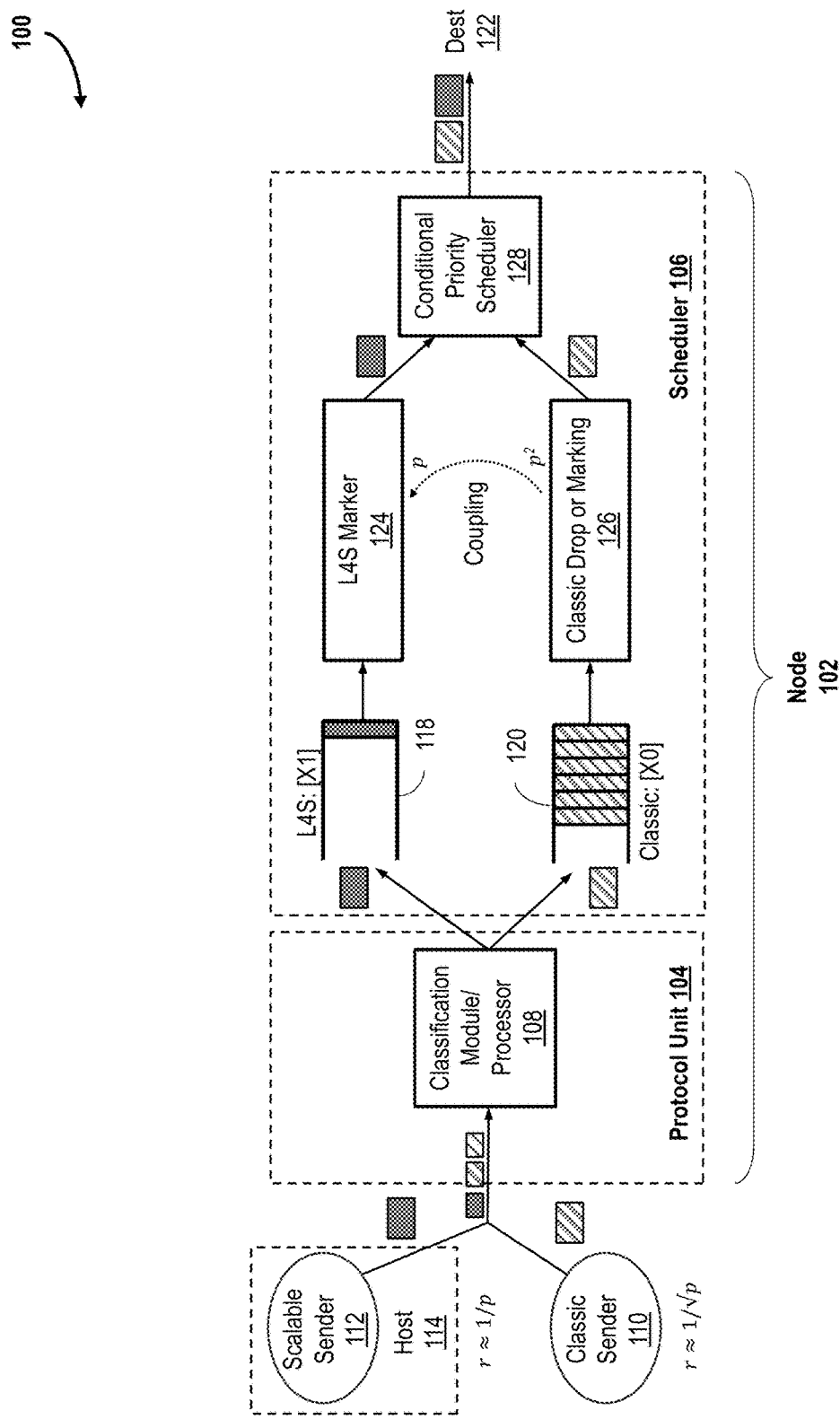
FIG. 1 is a schematic illustration depicting an exemplary packet data unit scheduling system, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

As described herein, "user equipment," or UE, refers to an electronic device or system utilizing a wireless technology protocol, such as Long Term Evolution (LTE) or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) and physical layer (PHY) interface, both of which may be 802.11-conformant and/or 802.16-conformant to a wireless medium (WM).

As used herein, a "Non-3GPP," or N3GPP, device is a device that utilizes non-3GPP access technology to connect to a residential gateway (RG), and which does not support the Non Access Stratum (NAS) over the N3GPP access. In contrast, an "Authenticable Non-3GPP," or AUN3, device is a Non-3GPP device that the 5G core network is able to authenticate, whereas a "Non-Authenticable Non-3GPP," or NAUN3, device is a Non-3GPP device that cannot be authenticated by the 5G core network.

As used herein, unless specified to the contrary, "modem termination system," or "MTS"" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

Unless otherwise described to the contrary herein, element and device terminology, including the respective functionalities thereof, should be considered to have substantially similar structure and functionality with components given the same labels in the respective 3GPP TSs and/or TRs cited above. Nevertheless, any term defined differently within the present written description, or which may be describes as having additional or different functionality, should be considered to take precedence over the definition of the same term in these other 3GPP TSs and/or TRs.

The innovative systems and methods described herein provide unique solutions to PDU handling over one or more data networks. The present embodiments leverage PDU management techniques, along with conventional Active Queue Management (AQM) techniques, to provide unique capabilities for controlling the quality (e.g., priority, path, handling, etc.) of all packets in a PDU set to prevent the loss of PDU sets due to different handling of individual packets within the PDU set.

For example, in the case of edge computing, i.e., where multiple data networks may provide a plurality of various PDU packets, conventional mechanisms allow a PDU set to include a first PDU packet from a first data network, and a second PDU packet from a different, second data network. Using such conventional mechanisms, high delay jitter may occur between the first PDU packet and the second PDU packet due to the different packet protocols used by the two networks, thereby resulting in varying reliability results between the first PDU packet and the second PDU packet. Such results present particular challenges in the case where the data network is considered for an XR application.

That is, a PDU set for an XR application may include one or more PDU packets having some interdependency among the set. For example, a single PDU set may include one or more audio frames and one or more video frames, where the respective audio and video frames may correspond to a same scene or a video clip. Accordingly, the quality of services (QoS) across the multiple PDU packets should be delivered such that the latencies of the multiple packets are maintained with low jitter. The reliability of the multiple packets should therefore be consistent to avoid possible drop of the entire PDU set due to one packet of the PDU set failing to meet the reliability needs of the PDU set (e.g., arriving outside of the delay boundary).

Some conventional techniques use packet switching mechanisms for traffic splitting and switching, including Active Queue Management (AQM). Multiple innovative AQM techniques are described in greater detail in U.S. Pat. No. 10,944,684 to the present Assignee, the subject matter thereof which is incorporated by reference herein in its entirety. This prior patent describes, a variety of AQM techniques for traffic flow over a network, including without limitation, Proportional Integral Controller Enhanced (PIE), Controlled Delay (CoDel), Fair/Flow Queueing+CoDel ("fq_codel" variant), Bottleneck Bandwidth and Round trip time (BBR), Low Latency Low Loss Scalable throughput (L4S), Dual Queue (DualQ), TCP-Prague, congestion exposure (ConEx), Data Center TCP (DCTCP), and Accurate ECN. For ease of explanation, the following embodiments are described with respect to DualQ and L4S techniques for PDU set handling. The person of ordinary skill in the art though, will understand that these examples are provided by way of illustration, and are not intended to be limiting.

However, conventional DualQ mechanisms do not provide means to control the quality (e.g., jitter, reliability, etc.) across the several PDU packets of the PDU set across a plurality of access networks. For example, multiple PDU packets may be delivered over a plurality of access networks (a) using dual connectivity or multi-connectivity, and/or (b) by way of 3GPP access and non-3GPP access, e.g., based on Access Traffic Steering Switching and Splitting (ATSSS). These delivery systems though, are not configured to control the quality of packets in the same PDU set that arrive from different networks.

Similar challenges arise with respect to the L4S paradigm. Conventional L4S Internet Service techniques adapt the data rate of packets based on network congestion that occurs at access networks, such as new radio (NR, 5G), wireline, and/or wireless LAN. In the access paradigm, congestion across the data network may be determined by an access node (e.g., a base station, an NG-RAN, an N3IWF gateway, a wireline gateway, an access gateway, a wireline access node, a modem termination system (MTS) or cable MTS (CMTS), a modem or cable modem (CM), an optical network terminal (ONT), an optical line terminal (OLT), and the like). The processor of the respective node may then, using the ECN protocol, set an ECN-capable Transport (ECT) congestion flag in an IP header based on the determined congestion.

However, for a PDU set, a first packet of a PDU set may be set with one congestion flag (e.g., (e.g., ECT(1), indicating congestion), whereas a second packet of the PDU set may not indicate congestion (e.g., set with ETC(0)). In this scenario, the first packet may be delivered very quickly relative to the second packet, thereby resulting in a significantly different quality of experience from this difference, such as possible delay or jitter between the first and second packets, where the second packet may exceed the required latency/jitter of the PDU set. In this case, the node may drop the entire PDU set, including the first packet, leading to significant performance degradation. The following embodiments provide innovative solutions to overcome this problem, yielding significant improvements to the L4S framework for PDU set handling.

In an exemplary embodiment, PDU set handling is improved by enhancing one type of PDU packet handling technology (e.g., DualQ, dual connectivity, carrier aggregation, etc.) with a congestion control mechanism of another technology (e.g., L4S) to greatly enhance the quality of experience and mitigate the risk of dropping entire PDU sets. A PDU set, for example, includes a plurality of IP packets and/or PDU packets, and the packet forwarding policies of one network may not be the same as the policies of another network that may add packets to, or forward, the PDU set. These differences in packet handling may result in the particular per-packet policy/QoS/queueing for one packet in the PDU set being different than for other packets in the same PDU set. The following embodiments thus demonstrate how particular principles from different technologies may be utilized together to enable a node to enable all packets within the same PDU set to have substantially the same handling, reliability, latency, and quality.

FIG. 1 is a schematic illustration depicting an exemplary PDU scheduling system 100. System 100 includes a node 102, which may, for example, represent one or more of a base station, a gateway, a router, an access node, an OLT, an ONT, a MTS/CMTS, a modem/CM, a broadband network gateway, a Wi-Fi AP, an N3IWF, a TNGF, a W-AGF, an AGF, a processor enabled for network function (e.g., user plane function (UPF)), and/or similar devices, servers, or components having traffic delivery capabilities. In an exemplary embodiment, node 102 includes a protocol unit 104 and a traffic or network scheduler 106. In some embodiments, protocol unit 104 and scheduler 106 are contained within the same node 102. In other embodiments, protocol unit 104 and a scheduler 106 may be distributed across multiple nodes 102.

In the exemplary embodiment depicted in FIG. 1, protocol unit 104 is configured with scheduling functionality, and includes a classification module 108 that is configured to track the received upstream traffic and classify service flows (e.g., as active and/or inactive). In some embodiments, classification module 108 may be configured to estimate bandwidth demand for active service flows from, for example, a classic sender 110 and a scalable sender 112, e.g., of a host 114. Scheduler 106 may then proactively schedule the bandwidth, and/or other protocol resources, according to the estimated demand. Either or both of classic sender 110 and scalable sender 112 may, for example, be or represent one or more of an application, and end device, and a server configured to send data packets at a packet rate r. In the exemplary embodiment, each of protocol unit 104, scheduler 106, and classification module 108 may include, or utilize, one or more processors (not separately shown) to implement one or more algorithms according to the techniques described herein.

In operation of system 100, classification module 108 may be further configured to separate the traffic from scalable sender 112 into a first traffic queue 118, and from classic sender into a second traffic queue 120. In the exemplary embodiment depicted in FIG. 1, first traffic queue 118 is dedicated to sending a low latency, high-priority (e.g., L4S ([X1]), in this example) service flow, e.g., where the packet rate r is inversely proportional to a packet drop/mark probability p, and second traffic queue 120 is dedicated to sending a lower-priority (e.g., classic ([X0]), in this example) service flow, e.g., where r≈1/√p. That is, classification module 108 may be advantageously configured to implement both L4S and DualQ AQM functionality to prioritize traffic from senders 110, 112 differently.

In conventional systems, however, where a single PDU set intended for a destination 122 may contain packets having different classification priorities, the risk of dropping the entire set increases when one or more of the lower priority packets is dropped or falls outside of a delay boundary. Destination 122 may, for example, represent a master cell group (MCG) and/or a secondary cell group (SCG) (not separately shown). In the case where destination 122 includes both of an MCG and an SCG, the MCG may represent a first access network, and the SCG will then represent a different, second access network. In such a scenario, node 102 of system 100 may therefore represent one or more bearers configured to support a PDU session with a PDU set enabled for delivery to only one of the first and second access networks for each individual PDU set.

According to this example, a first PDU set of a PDU session may be delivered to one access network (e.g., the MCG/first access network), and a second PDU set of the PDU session may be delivered to another (e.g., the SCG/second access network). Thereafter, the MCG or the SCG may determine where to transmit each PDU set when the one or more bearers of a PDU set is configured across the MCG and the SCG. In the case of a bearer of an XR application, i.e., when a PDU set is enabled, a base station (e.g., of the MCG or SCG) or Service Management and Orchestration element (SMO, e.g., for 5G) may determine that that the PDU session of the XR application is configured for only one of the access network cell groups (e.g., the MCG or the SCG) for a wireless device (not shown) of the XR application that is established with the MCG and SCG.

In this scenario, the wireless device may be configured to indicate whether the wireless device is established with a dual connectivity or multi-access connectivity during a PDU session for the XR application. Conventionally, the one or more bearers of the PDU session may be established by way of the MCG or the SCG, but may not be enabled with a split bearer across both of the MCG and SCG. For example, a base station or NG-RAN may not configure or allocate a split bearer for a PDU session if the PDU session is for an XR application, if the PDU session is configured with a PDU set capability, and/or the PDU session is enabled with functionality related to a PDU set/XR functionalities.

Alternatively, the wireless device may indicate, or provide assistance information on, a desired bearer type for the PDU session or the XR application. That is, the wireless device may indicate a preference an MCG bearer, an SCG bearer, or a split bearer. Furthermore, the wireless device additionally, optionally, and/or separately may indicate one or more serving cells where the wireless device prefers to receive data of the PDU session, data of the XR application, or for a XR application layer. For the purposes of these examples, a multi-cell group is defined as including multiple cell groups (e.g., including at least the MCG and SCG), and may be implemented for a plurality of respective serving cells. For example, a first serving cell may follow the MCG, whereas a second serving cell may follow the SCG.

Where a split bearer is configured for the PDU session enabled with a PDU set, the node/base station may transmit to, or forward from, the wireless device the respective data from, or to, a data network from individual units of the PDU set. For example, one or more packets or PDUs belonging to a same PDU set may be delivered by way of the same cell group (e.g., the MCG or SCG), a same serving cell, a same numerology, a same bearer, and/or a same bandwidth part, etc. In the case of a split bearer configured for the PDU session enabled with a PDU set, and also for an XR application/PDU set (e.g., also applicable for another bearer type), the wireless device may additionally or alternatively transfer delay information (e.g., of the PDU session or the bearer) from each cell group of the multi-cell group.

For example, a wireless device may indicate or transmit one or more buffer status reports (BSRs), measurement reports, and/or Radio Resource Control (RRC) messages (e.g., for 5G). The wireless device may thus piggyback a first delay and/or jitter information of the MCG and a second delay and/or jitter information of the SCG. In some cases, the wireless device piggybacks the first delay and the second delay in the same message/report (i.e., belonging to the respective BSRs, measurement reports, and/or RRC messages). In other cases, the wireless device piggybacks the first delay in a separate message/report from the second delay.

In at least one embodiment, the PDU set of the PDU session may be delivered to a serving cell when the wireless device is configured and/or activated with a plurality of the serving cells. For example, a base station of a particular serving cell may schedule resources of a first PDU set of the PDU session by way of a first serving cell, and resources of a second PDU set of the PDU session by way of a different second serving cell.

In the exemplary embodiment depicted in FIG. 1, system 100 is further configured for L4S functionality, such that a PDU session of a XR application may be enabled with a LAS architecture/framework. In exemplary operation of system 100, node 102 (e.g., a base station) processes the PDU session, and scheduler 106 further includes an L4S marking unit 124 supporting ECN tagging of traffic queue 118, e.g., using an IP header and/or queueing mechanism (DualQ, in this example) to support low latency traffic of second traffic queue 120 with or without congestion.

In further exemplary operation of system 100, an LAS-enabled application may indicate ECT(0) in the IP header of a PDU packet, which indicates that the particular PDU packet is to be delivered enabled with L4S priority. In this example, L4S marking unit 124 is further configured to, upon congestion detection (e.g., by the base station, network function, or user plane function (UPF) of node 102, in responding to detecting a congestion, for the PDU packet with ECT(0), may set or change a value of the packet's ECN field from ECT(0) (or ECT(00) to ETC(1) (or ETC(01)), thereby indicating that a congestion occurs for the PDU packet.

In an exemplary embodiment, scheduler 106 further includes a classic drop/marking unit 126 coupled with L4S marking unit 124, as well as a conditional priority scheduling unit 128 (e.g., for a base station, UPF, etc.). Thus, upon congestion occurrence for the PDU packet, conditional priority scheduling unit 128 may be configured to dynamically change the scheduling/queuing of the PDU packet when congestion occurs, e.g., by adapting a priority value of the PDU packet, and/or sending the PDU packet to the L4S queue (e.g., first traffic queue 118), In at least one embodiment, conditional priority scheduling unit 128 may additionally, or alternatively, adapt QoS parameters of the PDU packet to the changing conditions (e.g., detected congestion).

For ease of explanation, the preceding description of system 100 addresses the dynamic packet handling capabilities of the present embodiments with respect to a single PDU packet and some conditions detected therefor. Handling of all packets in an entire PDU set is described further below with respect to FIG. 2.

Figure 2:
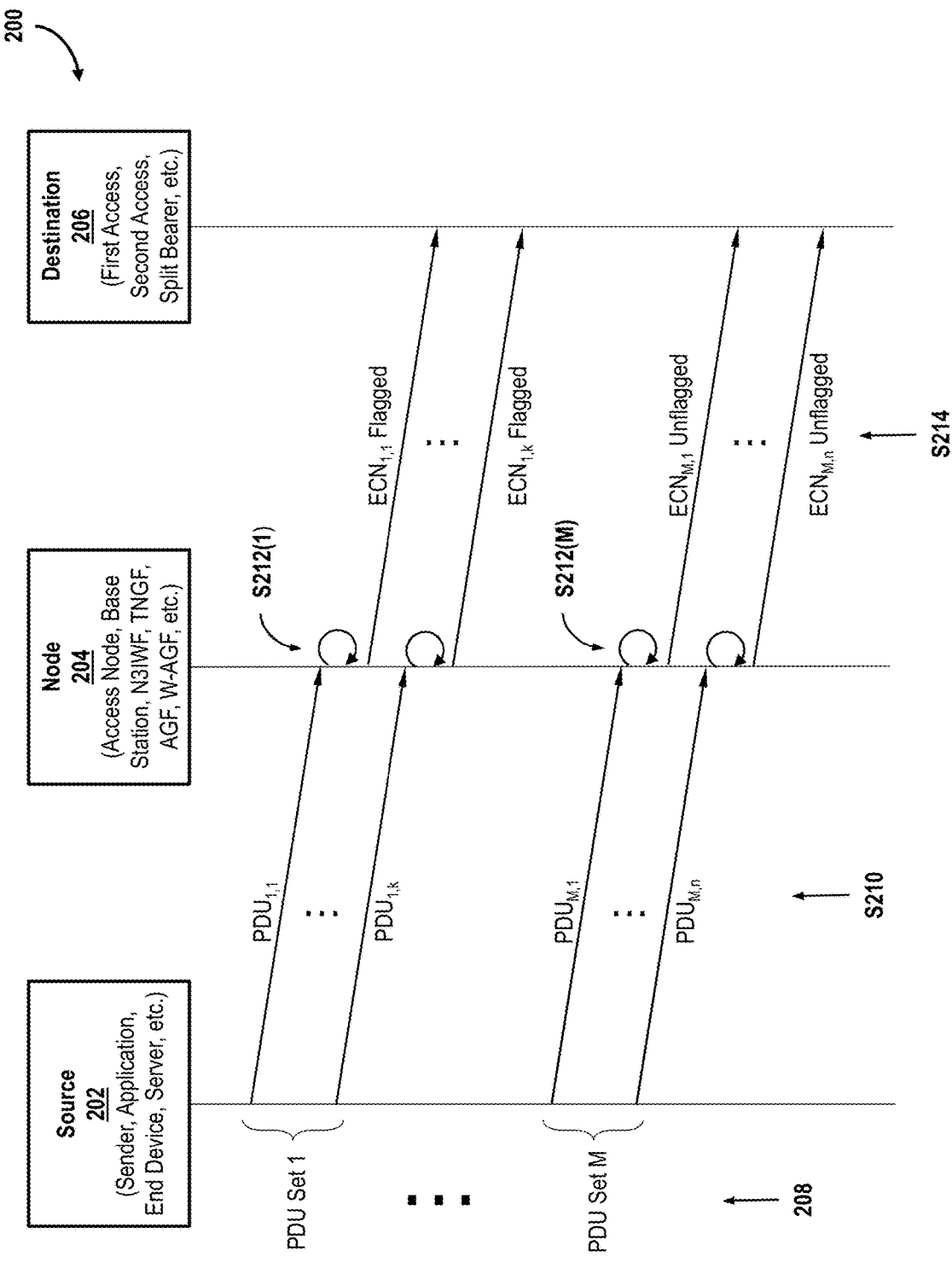
FIG. 2 is a sequence flow diagram depicting an exemplary packet data unit flagging process, in accordance with an embodiment.

FIG. 2 is a sequence flow diagram depicting an exemplary PDU flagging process 200. In an exemplary embodiment, process 200 is executed among and with respect to a source 202 (e.g., senders 110, 112, FIG. 1), a node 204 (e.g., node 102, FIG. 1), a destination 206 (e.g., destination 122, FIG. 1), and at least one PDU set 208 (i.e., 1-M PDU sets 208) from source 202 for a distinct respective PDU session. Unless described below to the contrary, one or more of the several steps, subprocesses, and/or subroutines of on process 200 may be performed in a different order, and/or two or more of the several steps/subprocesses/subroutines may be performed simultaneously.

In exemplary operation, process 200 begins at step S210, in which node 204 receives a first PDU of a particular PDU set 208 from source 202. In step S212, node 204 determines the respective protocol and/or priority for the received first PDU (e.g., by classification module 108, FIG. 1) and flags the received PDU accordingly. In an exemplary embodiment of step S212, node 204 executes at least one AQM technique on the received first PDU based on a classification, protocol, and/or desired quality of the entire particular PDU set 208. In some embodiments of step S212, node 204 (a) determines/sets the ECN bit (e.g., when L4S-enabled), and/or (b) determines the queue selection (e.g., when DualQ-enabled), of the first received PDU. In step S214, node 204 sends the flagged PDU to its intended destination 206 according to the priority or other parameters indicated by the flag set in step S212.

According to the innovative techniques of process 200, steps S210 through S214 are then repeated for each subsequent PDU of the particular PDU set 208 until all PDUs in that PDU set 208 have been processed, flagged, and sent to destination 206. In contrast to conventional techniques though, once node 204 has flagged the first PDU in a particular PDU set 208, all subsequent PDUs of that PDU set 208 will be processed/flagged the same as the first PDU so that the handling of all PDUs in the same set will steered, prioritized, and/or managed the same to mitigate the possibility of dropping an entire PDU set due to one individual PDU being handled differently than the others, such as in the case where one PDU falls outside of the delay boundary.

In the exemplary embodiment depicted in FIG. 2, process 200 is illustrated as operating with respect to a plurality of M PDU sets 208 (i.e., 1-M PDU sets 208, in this example). A first PDU set 208(1) of the M PDU sets 208 is shown to include a plurality k of PDUs (i.e., 1-k PDUs), whereas the Mth PDU set 208(M) is shown to include a plurality n of PDUs (i.e., 1-n PDUs). Accordingly, for this example, node 204 determines that the first PDU of first PDU set 208(1) (i.e., $PDU_{1,1}$) is to be flagged as higher priority, and in step 212(1), sets the ECN bit accordingly. Thereafter, the respective ECN bit of each subsequent PDU of first PDU set 208(1) is flagged the same, until the last PDU of first PDU set 208(1) (i.e., $PDU_{1,k}$) is processed and sent to destination 206.

Further to this example, for illustration purposes, process 200 is depicted to manage Mth PDU set 208(M) similarly, but with the determination by node 204 that PDU set 208(M) is to be handled with lower priority for the entire set. Accordingly, the first PDU of Mth PDU set 208(M) (i.e., $PDU_{M,1}$) is to be flagged as lower priority, or unflagged, in the case where $PDU_{M,1}$ may have originally been flagged as higher priority (or received from an LAS queue). Thereafter, steps S210 through S214 of process 200 are then repeated until the last PDU of Mth PDU set 208(M) (i.e., $PDU_{M,n}$) is processed and sent to destination 206. For this example, since node 204 determines that Mth PDU set 208(M) need not be delivered with high priority, every PDU of Mth PDU set 208(M) is unflagged to prevent potential higher-priority PDUs of the set from arriving too far in advance of the other PDUs in the set.

In an exemplary implementation of process 200, a PDU session of an XR application includes the plurality M of PDU sets 208, each having a respective plurality (e.g., k, n, etc.) of PDU packets. A base station or UPF of node 204 receives, at a first time, a first packet or PDU (e.g., $PDU_{1,1}$, $PDU_{M,1}$) of a PDU set 208 (e.g., PDU set 208(1), 208(M)), and a second packet or PDU of that PDU set 208 at second time subsequent to the first time. At the first time, node 204 (or base station or UPF thereof) may not detect congestion when the first packet/PDU is received. However, node 204 may detect/determine a congestion at the second time when the second packet/PDU is received, or at time between the first and second times. In the case where node 204 did not set ECT(1) for the first packet/PDU, node 204 will not change the ECN bit field of the IP header of the second packet/PDU of that PDU set 208, even upon the later congestion detection/determination after receiving the first packet/PDU, but before all packets/PDUs of that PDU set 208 are received, processed, and delivered.

According to this exemplary implementation of process 200, a different result is achieved in comparison with conventional techniques. That is, whereas a conventional data traffic management system would be expected, once the congestion is detected after reception of the first packet/PDU (i.e., after the first time), to change the ECN bit of subsequent packets/PDUs of that PDU set 208 from ECT(0) to ECT(1), the ECN bit of the subsequent packets does not change according to process 200.

In an alternative implementation, node 204 may detect/determine a congestion occurrence at or prior to the first time, when the first starting packet/PDU of the particular PDU set is received by node 204. In this scenario, node 204 may set the ECN bit for the first packet/PDU to ECT(1), or change the ECN bit from ECT(0) to ECT(1) if the ECN bit had already been set by the sender. Thereafter, node 204 may then advantageously manage all of the ECN bits of subsequent packets/PDUs of that PDU set 208 such that all such respective subsequent ECN bits remain, or are changed to, ECT(1). In an exemplary embodiment, node 204 is configured to update a congestion status for a following, second PDU set 208(2) once the last packet/PDU of the first PDU set 208(1) has been processed as described above. According to conventional techniques, the congestion status may update within the processing time of a single PDU set, thereby increasing the risk that the entire set may be dropped.

In at least one exemplary implementation, node 204 may determine a congestion status at the time an ending (or latest) packet/PDU of a PDU set 208 (e.g., PDU set 208(1)) is received. In this case, node 204 may be further configured to utilize this congestion detection/determination for the immediately following subsequent PDU set 208 (e.g., PUD set 208(2)), and set the respective ECN bit of the first packet/PDU of the immediately following set to ECT(1).

More particularly, in this example, node 204 sets the congestion status (i.e., the ECN bit) for a first packet/PDU of a second PDU set 208(2) based on a last packet/PDU of an immediately-preceding first PDU set 208(1). Accordingly, node 204 may set the ECN bit to ECT(1) for all of the respective packets/PDUs of the second PDU set 208(2). According to this exemplary implementation, subsequent PDU sets 208(2-M) may be advantageously handled in a more timely and efficient manner.

In an exemplary embodiment, the scheduler of an access node (e.g., conditional priority scheduling unit 128, FIG. 1) may be further configured to send one or more packets of a PDU set to a same queue between an L4S-enabled queue (e.g., first traffic queue 118, FIG. 1) and a non-L4S-enabled (e.g., DualQ-enabled) queue (e.g., second traffic queue 120, FIG. 1), irrespective of the ECN field of a particular packet/PDU. For example, a queue for a given PDU set may be determined based on an earliest, first, initial, or starting packet/PDU of that PDU set. Alternatively, the queue of a following second PDU set may be determined based on a last, latest, of ending packet/PDU of a first PDU set preceding the second PDU set. In this alternative scenario, it is presumed that the first PDU set occurs before the second PDU set, and that no other packets/PDUs are received by the access node between the last packet/PDU of the first PDU set and the first packet/PDU of the second PDU set. These innovative queue determination techniques are thus of particularly advantageous utility in the case of XR applications for multiple PDU sets where individual packets/PDUs thereof may arrive from a variety of different sources.

Exemplary embodiments of systems and methods for differentiated PDU set handling are described above in detail. The several examples above are described with respect to dual connectivity/DualQ and L4S functionality, but the person of ordinary skill in the art will understand that the principles herein are not exclusive of such conventional technologies or other developing standards. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of processing a protocol data unit (PDU) set for a data network, comprising the steps of:
   receiving a first PDU packet of the PDU set, wherein the first PDU packet includes a first congestion flag;
   receiving, subsequent to reception of the first PDU packet, a second PDU packet of the PDU set, wherein the second PDU packet includes a second congestion flag different from the first congestion flag;
   determining, after receiving the first and second PDU packets, a congestion status of the data network for the PDU set;
   controlling, based on the determined congestion status, a handling state of the second PDU packet to match a handling state of the first PDU packet; and
   transmitting the first PDU packet and the controlled second PDU packet to a destination receiver of the data network.

2. The method of claim 1, wherein the steps of receiving the first and second PDU packets are performed by at least one of an access node, a base station, a gateway function, and a user plane function (UPF).

3. The method of claim 1, wherein the step of controlling comprises a substep of setting (i) a first explicit congestion notification (ECN) state on the first PDU packet, and (ii) a second ECN state on the second PDU packet to match the first ECN state.

4. The method of claim 1, wherein the step of controlling comprises a substep of selecting, from a plurality of queues available to the first and second PDU packets, a first queue for the PDU set including both of the first and second PDU packets.

5. The method of claim 1, wherein the step of controlling comprises a substep of changing a first internet protocol (IP) header of the first PDU packet to a first value.

6. The method of claim 5, further comprising a substep of changing a second IP header of the second PDU packet to a second value equal to the first value.

7. The method of claim 1, wherein the step of controlling comprises a substep of setting (i) a first congestion level on the first PDU packet, and (ii) a second congestion level on the second PDU packet to match the first congestion level.

8. A method of processing a protocol data unit (PDU) set for a data network, comprising the steps of:
receiving a first PDU packet of the PDU set, wherein the first PDU packet includes a first congestion flag;
receiving, subsequent to reception of the first PDU packet, a second PDU packet of the PDU set, wherein the second PDU packet includes a second congestion flag different from the first congestion flag;
identifying that the first PDU packet is the first PDU packet of the PDU set in time;
determining a congestion status for the PDU set based on the received first PDU packet;
controlling, based on the determined congestion status, a handling state of the second PDU packet to match a handling state of the first PDU packet; and
transmitting the first PDU packet and the controlled second PDU packet to a destination receiver of the data network.

9. The method of claim 8, wherein the steps of receiving the first and second PDU packets are performed by at least one of an access node, a base station, a gateway function, and a user plane function (UPF).

10. The method of claim 8, wherein the step of controlling comprises a substep of setting an explicit congestion notification (ECN) state on the second PDU packet to match an ECN state of the first PDU packet.

11. The method of claim 10, further comprising a substep of setting an ECN state of all subsequent PDU packets of the PDU set to match the ECN state of the first PDU packet.

12. The method of claim 8, wherein the step of controlling comprises a substep of selecting, from a plurality of queues available to the first and second PDU packets, a first queue for the PDU set based on the first PDU packet.

13. The method of claim 8, wherein the step of controlling comprises a substep of changing at least one bit of an internet protocol (IP) header of the second PDU packet to match a respective IP header bit of the first PDU packet.

14. The method of claim 13, further comprising a substep of managing the respective IP header bits of all subsequent PDU packets of the PDU set to match the respective IP header bit of the first PDU packet.

15. The method of claim 8, wherein the step of controlling comprises a substep of setting a congestion level on the second PDU packet to match a congestion level on the first PDU packet.

16. The method of claim 15, further comprising a substep of setting the congestion level of all subsequent PDU packets of the PDU set to match the congestion level on the first PDU packet.

17. An access node for a data network, comprising:
a processor; and
a memory having computer-executable instructions stored therein, which, when executed by the processor, cause the access node to:
receive (i) a first protocol data unit (PDU) packet of a first PDU set, and (ii) a second PDU packet of the first PDU set subsequent to reception of the first PDU packet, wherein the first PDU packet includes a first congestion flag, and wherein the second PDU packet includes a second congestion flag different from the first congestion flag;
establish a distinct PDU session for the first PDU set;
determine a congestion status of the data network for the first PDU set;
control, based on the determined congestion status, a handling state of the second PDU packet to match a handling state of the first PDU packet; and
transmit the first PDU packet and the controlled second PDU packet to a destination receiver of the data network.

18. The access node of claim 17, further comprising at least one of an access node, a base station, a gateway function, and a user plane function (UPF).

19. The access node of claim 17, further comprising a classification module configured to classify, for the PDU set, at least one of a protocol, a priority, and a traffic queue.

20. The access node of claim 17, further comprising a scheduling unit configured to schedule all PDU packets of the PDU set to have the same handling state as the first and second PDU packets.

* * * * *